(12) United States Patent
Horikami

(10) Patent No.: US 6,778,905 B2
(45) Date of Patent: Aug. 17, 2004

(54) POINT REGISTERING DEVICE

(75) Inventor: Shugo Horikami, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/111,001

(22) PCT Filed: Aug. 20, 2001

(86) PCT No.: PCT/JP01/07126
§ 371 (c)(1),
(2), (4) Date: Apr. 19, 2002

(87) PCT Pub. No.: WO02/16872
PCT Pub. Date: Feb. 28, 2002

(65) Prior Publication Data
US 2002/0165661 A1 Nov. 7, 2002

(30) Foreign Application Priority Data
Aug. 21, 2000 (JP) ........................ 2000-249707

(51) Int. Cl.⁷ ................ G06F 19/00; G01C 21/02
(52) U.S. Cl. .............. 701/213; 701/206; 701/208; 701/116; 340/989; 342/457
(58) Field of Search ................ 701/213, 200, 701/201, 206, 207, 217, 208, 116; 340/988, 990, 995.1, 989; 342/457, 358

(56) References Cited
U.S. PATENT DOCUMENTS 5,546,092 A * 8/1996 Kurokawa et al. ..... 342/357.06
6,035,253 A * 3/2000 Hayashi et al. .............. 701/211
6,049,753 A * 4/2000 Nimura ....................... 701/201
6,144,318 A * 11/2000 Hayashi et al. ............. 340/995
6,173,232 B1 * 1/2001 Nanba et al. ................ 701/209
6,446,002 B1 * 9/2002 Barton ........................ 701/211

FOREIGN PATENT DOCUMENTS

| DE | EP0874220 A2 | 10/1998 |
| DE | EP0957341 A2 | 11/1999 |
| JP | 9-240431 | 9/1997 |
| JP | 10-176929 | 6/1998 |
| JP | 10-226315 | 8/1998 |
| JP | 10-300487 | 11/1998 |
| JP | 11-133135 | 5/1999 |
| JP | 2000-2548 | 1/2000 |

* cited by examiner

Primary Examiner—Thomas G. Black
Assistant Examiner—Ronnie Mancho
(74) Attorney, Agent, or Firm—Louis Woo

(57) ABSTRACT

The present invention provides a system for automatically registering destination of visit or a normally stationed spot to a mobile information system such as car navigation system. A position information detected by position detecting means 101 is stored in position storage means 102. From the position information or from pattern of moving loci stored in the position storage means 102, the position recognizing means 103 recognizes a place frequently visited or a normally stationed spot of the system, and these are registered automatically as registered destination or a normally stationed spot (owner's own home). Thus, the destination frequently visited can be registered without performing specific operation. The registered position can be used as a place of destination for searching a desirable route for the vehicle. Also, by recognizing the normally stationed spot, theft can be detected.

13 Claims, 6 Drawing Sheets

RECORDS OF DEPARTURE AND ARRIVAL

| | 901 |
|---|---|
| DEPARTURE | MARCH 5, 2000 ( SUNDAY) 12:00 |
| ARRIVAL | MARCH 5, 2000 ( SUNDAY) 21:00 |
| DEPARTURE | MARCH 11, 2000 ( SATURDAY) 4:00 |
| ARRIVAL | MARCH 12, 2000 ( SUNDAY) 21:00 |
| DEPARTURE | MARCH 19, 2000 ( SUNDAY) 6:00 |
| | |

PRIOR ART

POINT REGISTERING DEVICE

FIELD OF THE INVENTION

The present invention relates to a spot registration system, and in particular, to a spot registration system for registering a spot or a place or a locality to a mobile information system such as a car navigation system or a portable mobile terminal.

BACKGROUND ART

In a car navigation system used in the past, there is provided a function to register a position such as a place frequently visited or owner's own home by manual operation from map screen. FIG. 10 shows a functional block diagram of a conventional type spot registration system. The user sets a spot to be registered in advance, and a route to a selected spot as destination can be searched by easy operation and procedure by simply selecting the spot from a list of the registered spots without the need of searching the destination from the map screen. In particular, when the position of owner's own home is registered by differentiating it from the other spots, a route to the home can be searched by a single button operation. It is very convenient because this is a function to be used frequently.

In the conventional type car navigation system, however, the operation to register position of user's own home is not very easy to perform for a user, who uses the car navigation system for the first time. Also, for the other spots to be registered, there have been problems in that registration must be made through selection of a spot by putting consideration on the purpose to use the registered spot.

DISCLOSURE OF THE INVENTION

To solve the above problems, it is an object of the present invention to provide a system, which can automatically register information on a spot or a place or a locality to a mobile information system such as a car navigation system.

To attain the above object, the spot registration system for registering position to a mobile information system according to the present invention comprises position detecting means for detecting position of the system, position storage means for storing the detected position, position recognizing means for recognizing a spot to be registered according to position storage information obtained from the position storage means, and means for registering the recognized spot.

The spot registration system as described here is not limited to a system physically enclosed in a housing, but it also means a system, which is dispersed in a plurality of housings for each of the means incorporated, whereby these housings are connected with each other via wired or wireless system and these serve as a spot registration system as a whole.

With the arrangement as described above, position information obtained from the position detecting means is analyzed to estimate the normally stationed spot of the system or the place frequently visited, and the position of the normally stationed spot or the visiting place can be automatically registered.

BEST MODE FOR CARRYING OUT THE INVENTION

Description will be given below on embodiments of the present invention referring to FIG. 1 to FIG. 9.

(1st Embodiment)

A first embodiment of the spot registration system according to the present invention is a spot registration system for detecting and storing position of the system in memory and for automatically recognizing a spot or a place to be registered from the pattern of the position stored in memory.

Figure 1:
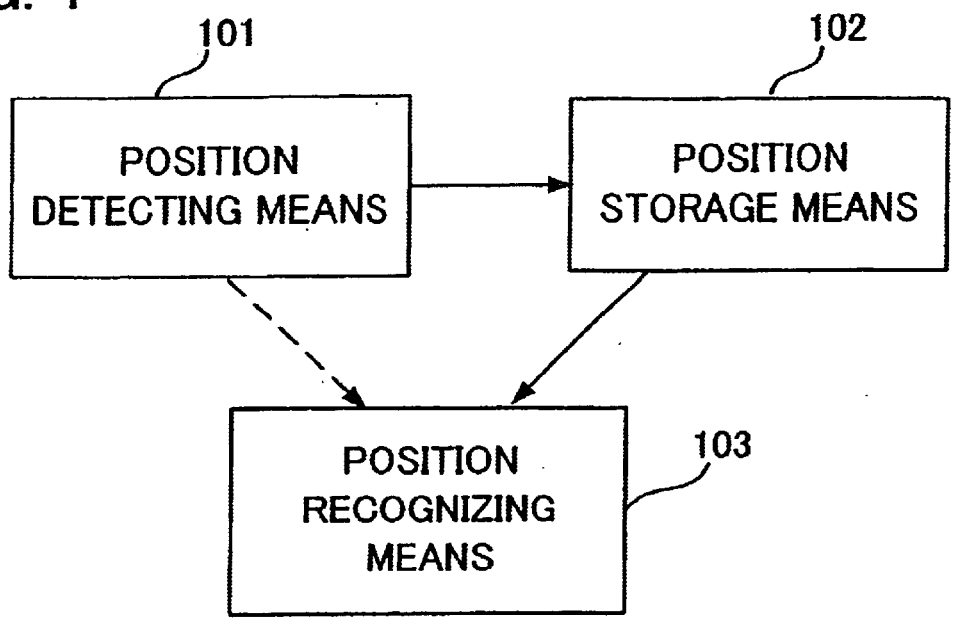
FIG. 1 is a functional block diagram of a first embodiment of a spot registration system according to the present invention.

FIG. 1 is a functional block diagram of a first embodiment of a spot registration system according to the present invention. In FIG. 1, position detecting means 101 is means for detecting position of the system. Positioning storage means 102 is means for storing the position in memory. Position recognizing means 103 is means for recognizing a visiting place or a normally stationed spot from history or pattern of the positions in storage.

Now, description will be given on operation of the spot registration system of the first embodiment of the present invention with the arrangement as described above. As a typical example, explanation will be given on a case where a spot or a place is registered in a mobile terminal such as a car navigation system.

A position information of a system detected by the position detecting means 101 is stored in the position storage means 102. The position recognizing means 103 automatically recognizes a position with relatively high probability of the presence of the system as a spot to be registered, and it registers the spot. A place having remarkably high presence probability is recognized as a normally stationed spot. It may be designed in such manner that confirmation is made to the user as to whether the spot may be registered or not.

In so doing, operation of the spot registration can be automated. Also, it is possible to register by automatically distinguishing a normally stationed spot such as driver's own home.

As described above, in the first embodiment of the present invention, the spot registration system is designed to detect and store position of the system and to automatically recognize the spot to be registered from the pattern of the positions in storage. As a result, it is possible to automatically register a spot with high presence probability of the system.

(2nd Embodiment)

A second embodiment of the spot registration system of the present invention is a system for detecting that the vehicle is stopped at the same place for longer than a given time period at night time, for instance, and for regarding this place as a spot to be registered.

Figure 2:
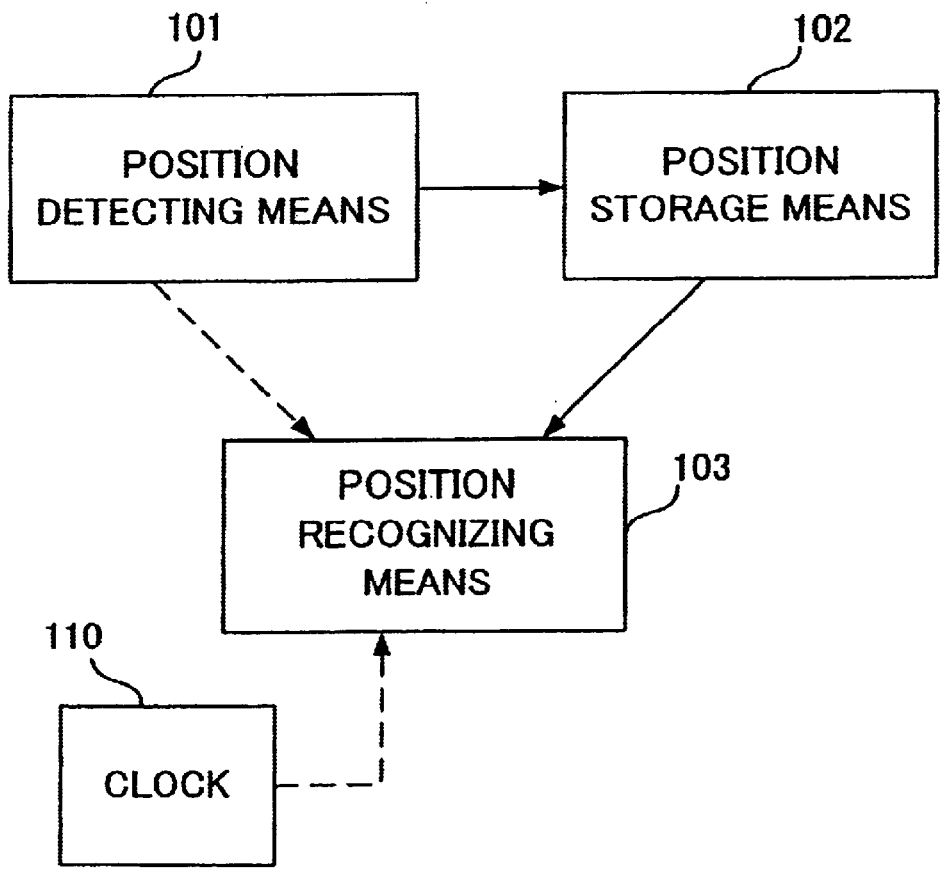
FIG. 2 is a functional block diagram of a second embodiment of the spot registration system according to the present invention.

FIG. 2 is a functional block diagram of the second embodiment of the spot registration system according to the present invention. Basic arrangement of the second embodiment is the same as that of the first embodiment except that a clock 110 is provided in the second embodiment. In FIG. 2, the clock 110 is means for informing the time to the position recognizing means 103.

Now, description will be given on operation of the second embodiment of the spot registration system according to the present invention with the above arrangement. A spot where the present position of the vehicle detected by the position detecting means 101 remains to be the same for a given time period or longer is recognized by the position recognizing means 103, and this is automatically recognized as the position to be registered.

A place where the vehicle is often parked or stopped for long time is a visiting place where the driver most frequently visits, and this place is automatically registered. Also, a place where the vehicle is present for a given time period or longer or a place with the highest probability of vehicle presence is possibly a normally stationed spot, and this spot can be registered as a normally stationed spot. As described above, using the time as a clue, spot registration can be performed in accordance with a comparatively simple logic.

Further, based on time information from the clock 110, it is detected how many nights the vehicle has been parked at the same place. In case the vehicle has been parked at the same place for a certain number of nights or longer, this spot is recognized as the place to be registered. Based on the fact that owner of the system stays overnight at his or her own home, it is recognized as the normally stationed spot.

As described above, the second embodiment of the present invention is designed in such manner that the spot registration system detects that the vehicle remains at the same place for a given time period or longer at night time or the like, and this place is regarded as the spot to be registered. As a result, a normally stationed spot or a visiting place can be automatically registered.

(3rd Embodiment)

A third embodiment of the spot registration system of the present invention is a system for regarding a position where the system is electrically charged as a spot to be registered.

Figure 3:
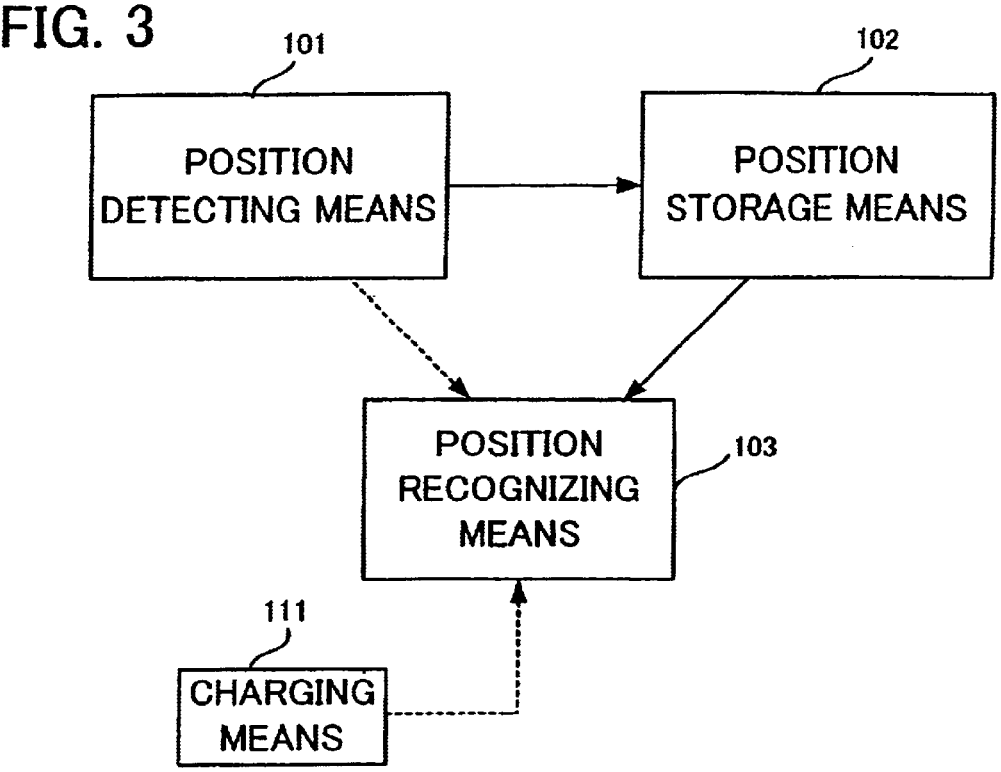
FIG. 3 is a functional block diagram of a third embodiment of the spot registration system according to the present invention.

FIG. 3 is a functional block diagram of the third embodiment of the spot registration system according to the present invention. Basic arrangement of the third embodiment is the same as that of the first embodiment except that electrically charging means 11 is provided. In FIG. 3, the charging means 11 charges electricity to the system, and it notifies the timing of the charging to the position recognizing means 103.

Now, description will be given on operation of the third embodiment of the spot registration system of the present invention with the above arrangement. When the system is electrically charged, this is notified to the position recognizing means 103 from the charging means 111.

A place where the system is present at the time of electrical charging is regarded as a normally stationed spot, and this position is registered as the normally stationed spot. However, the system is sometimes charged during driving time. Thus, it is checked whether the position is changed or not before and after the electrical charging. In this way, the normally stationed spot is recognized in simple manner and registration can be made automatically.

As described above, the third embodiment of the present invention is designed in such manner that the spot where electrical charging is performed is regarded as the spot to be registered, and the normally stationed spot can be automatically registered in simple manner.

(4th Embodiment)

A fourth embodiment of the spot registration system of the present invention is a system for detecting a position by identifying a base station of mobile communication means.

Figure 4:
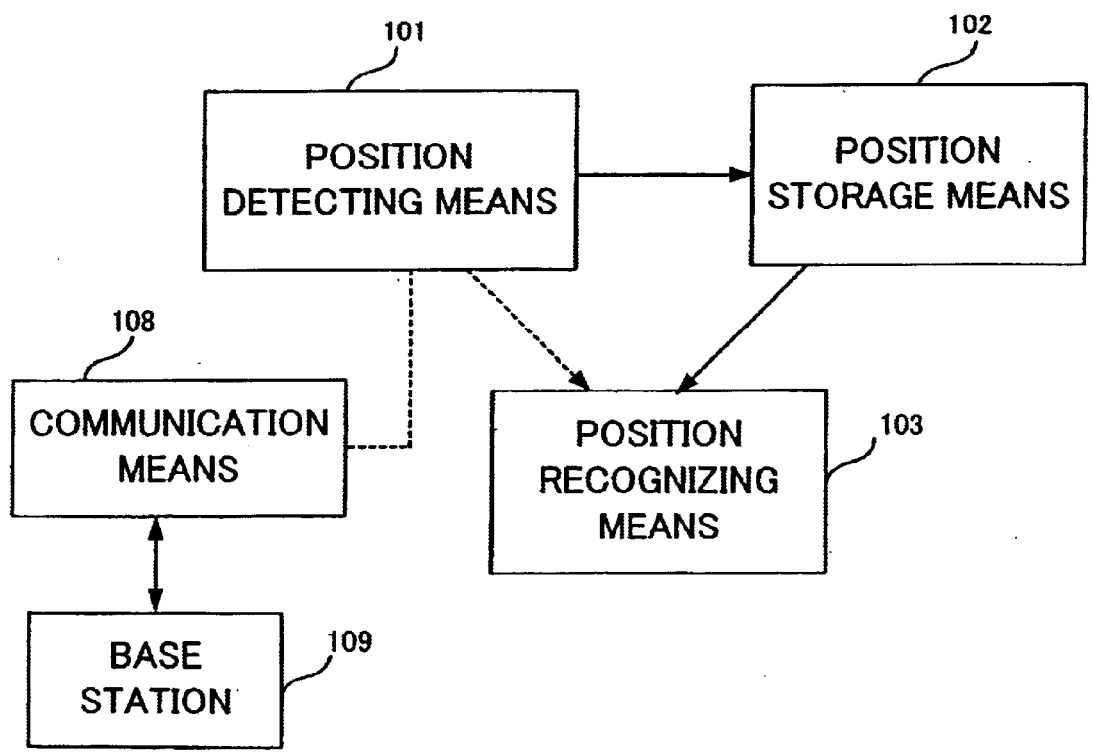
FIG. 4 is a functional block diagram of a fourth embodiment of the spot registration system according to the present invention.

FIG. 4 is a functional block diagram of the fourth embodiment of the spot registration system according to the present invention. Basic arrangement of the fourth embodiment is the same as that of the first embodiment except that communication means 108 is provided. In FIG. 4, the communication means 108 is mobile communication means such as a portable telephone. A base station 109 is a communication partner of the communication means 108.

Now, description will be given on operation of the fourth embodiment of the spot registration system according to the present invention with the above arrangement. As a clue to detect the position, the position detecting means 101 uses an information relating to a base station 109, which is a communication partner of the communication means 108. Based on a position information transmitted from the base station 109, the present position of the system is detected. Even with a terminal such as a portable telephone, in which primary purpose is not position detection, it is possible to automatically register a spot such as a normally stationed spot.

As described above, the fourth embodiment of the present invention is designed in such manner that a position is detected by identifying the base station of the mobile communication means. As a result, it is possible to automatically register a spot such as normally stationed spot.

(5th Embodiment)

A fifth embodiment of the spot registration system of the present invention is a system for detecting a position by utilizing GPS, a heading sensor, a mobile sensor, or VICS (vehicle information communication system).

Figure 5:
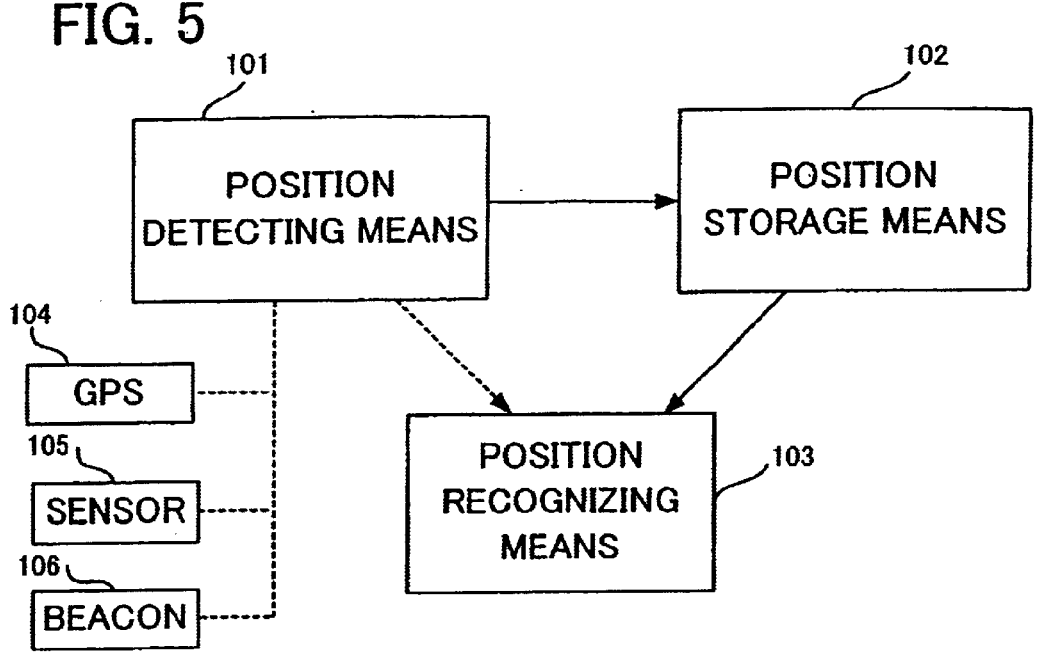
FIG. 5 is a functional block diagram of a fifth embodiment of the spot registration system according to the present invention.

FIG. 5 is a functional block diagram of the fifth embodiment of the spot registration system of the present invention. Basic arrangement of the fifth embodiment is the same as that of the first embodiment except that a GPS receiver 104, a sensor 105, and a beacon 106 are provided. In FIG. 5, the GPS receiver 104 is means for finding position by receiving electric wave from a GPS satellite. The sensor 105 comprises a heading sensor and a speed sensor. The beacon 106 is traffic information receiving means such as VICS.

Now, description will be given on operation of the fifth embodiment of the spot registration system of the present invention with the above arrangement. Using position information from the GPS receiver 104, from the sensor 105 such as the heading sensor or the speed sensor, or from the beacon 106 such as VICS, position is detected by the position detecting means 101.

It is possible to identify latitude and longitude of the present position by the GPS receiver, and, regardless of wherever it is, the present position can be identified if electric wave from GPS satellite is received. There is provided the sensor comprising the heading sensor and the mobile sensor, and the position can be detected according to the information from the sensor. Position can be determined by self-contained navigation method, and positioning can be performed even under the condition where electric wave from GPS satellite cannot be received. The beacon 106 is provided, and by receiving a position information offered from a traffic information providing system such as VICS, the present position can be identified. By this method, it is possible to determine the position with less influence from sensor error and with good matching with road network.

As described above, in the fifth embodiment of the present invention, the spot registration system is designed in such manner that position is detected by utilizing GPS, heading sensor, mobile sensor, and VICS. As a result, it is possible to detect the present position and register the position in reliable manner.

(6th Embodiment)

A sixth embodiment of the spot registration system of the present invention is a system to recognize a normally stationed spot of the system and the change of such spot.

Figure 6:
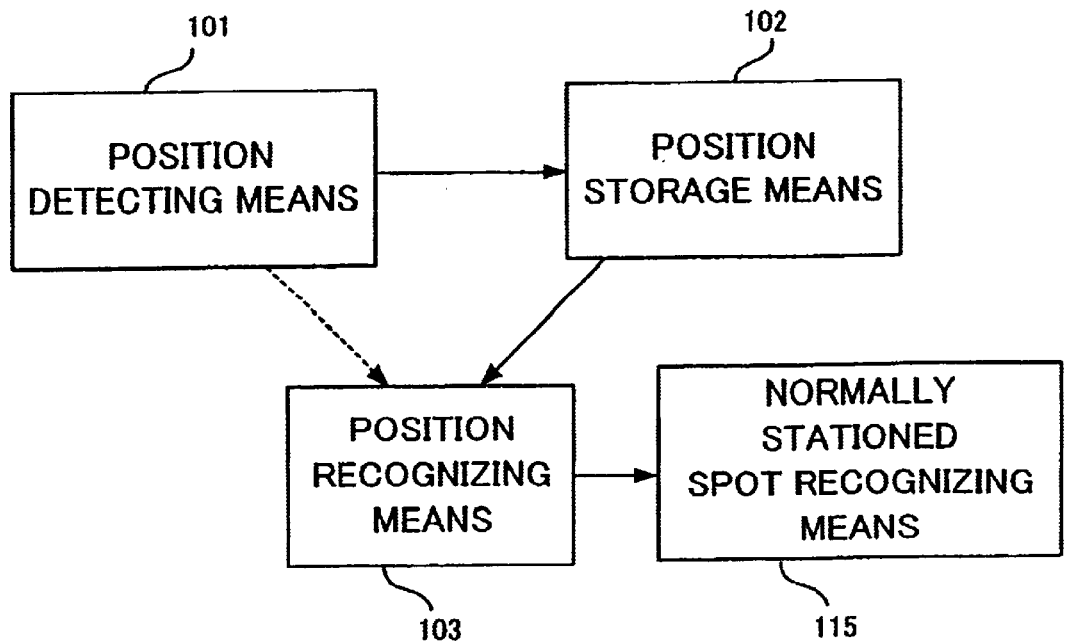
FIG. 6 is a functional block diagram of a sixth embodiment of the spot registration system according to the present invention.

FIG. 6 is a functional block diagram of the sixth embodiment of the spot registration system of the present invention. Basic arrangement of the sixth embodiment is the same as that of the first embodiment except that normally stationed spot recognizing means 115 is provided. In FIG. 6, the normally stationed spot recognizing means 115 is means to recognize a normally stationed spot from pattern of visiting.

Now, description will be given on operation of the sixth embodiment of the present invention with the above arrangement. Among the spots recognized by the position recognizing means 103 as the spots to be registered, a spot most frequently visited or a spot where the system is present for the longest time is recognized as a normally stationed spot by the normally stationed spot recognizing means 115.

The normally stationed spot recognizing means 115 analyzes the place most frequently visited from the pattern of visiting in the past, and a normally stationed spot of the system is recognized. For instance, a place most frequently visited or a place where the system is positioned for longest period of time is recognized as a normally stationed spot. Even when the user does not perform home registration operation on car navigation system, the system automatically registers the position of the user's home, and a user with less experience can use the home searching function.

Also, the normally stationed spot recognizing means 115 recognizes change of the normally stationed spot. When the owner of the system moves out or changes home to other place, or owner's home is delivered to another person due to some reason, the destination of the visit or the normally stationed spot is changed because of the difference in the procedure to use the system or difference of behavior pattern of the owner. This is automatically registered and a new normally stationed spot is automatically registered again. This makes it possible to eliminate troublesome operation for resetting by the user.

As described above, according to the sixth embodiment of the present invention, the spot registration system is designed in such manner that the normally stationed spot of the system and its change is recognized. Thus, it is possible to automatically register position of owner's home and to change it.

(7th Embodiment)

A seventh embodiment of the spot registration system according to the present invention is a system to detect change of the normally stationed spot of the system, to issue alarm sound and to turn on a signal lamp to indicate abnormality, to notify the change of the normally stationed spot, and to stop the function of the spot registration system.

Figure 7:
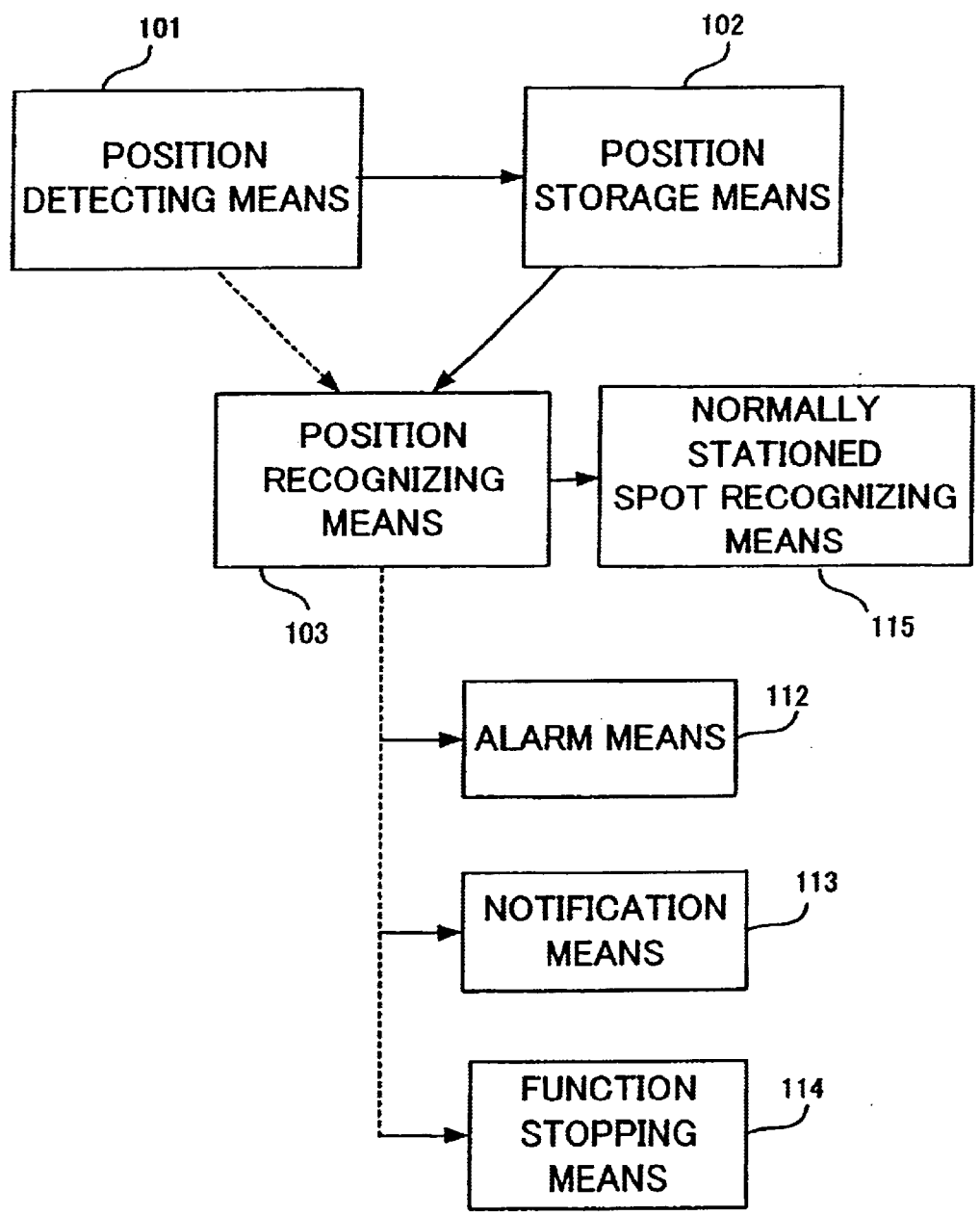
FIG. 7 is a functional block diagram of a seventh embodiment of the spot registration system according to the present invention.

FIG. 7 is a functional block diagram of the seventh embodiment of the spot registration system of the present invention. Basic arrangement of the seventh embodiment is the same as that of the sixth embodiment except that there are provided alarm means 112, notification means 113 and function stopping means 114. In FIG. 7, the alarm means 112 is means for notifying abnormal event by means such as sound or light. The notification means 113 is means for notifying abnormal event by means such as wireless communication. The function stopping means 114 is means for stopping function of the spot registration system.

Now, description will be given on operation of the seventh embodiment of the present invention with the above arrangement. When the position recognizing means 103 detects abnormal event, alarm is issued by the alarm means 112, and notification is made by the notification means 113. The function is stopped by the function stopping means 114.

When the position of the spot registration system is extremely deviated from the range of normal behavior pattern—in particular, when the change of the normally stationed spot is notified from the normally stationed spot recognizing means 115,—the position recognizing means 103 judges it as an abnormal event. If it is the change of the normally stationed spot, it may be according to the will or the intention of the user, and this is confirmed by a certified confirmation message. If it is a change unwillingly made, it is judged that theft is involved, and alarm or notification is issued.

Then, this abnormal condition is notified to the owner or the people around by the alarm means 112. In particular, when the spot registration system is installed on a vehicle, abnormal flashing of signal lamp is started by the alarm means 112, giving abnormal alarm sound. Then, the abnormal event is found by other persons, who would notify police station about the abnormality.

Also, the abnormality is notified by the notification means 113. When abnormal condition is notified from the position recognizing means 103, the notification means 113 notifies the abnormal condition to destinations of notification registered in advance. The information of position of the system and the new normally stationed spot are also notified. It is possible to notify while the person who stole it may not be aware, and this leads to high possibility to settle the problem.

The function stopping means 114 stops the function of the spot registration system when abnormal condition is detected, and this makes it possible to prevent illegitimate use of the system. For instance, it is possible to prevent illegitimate or unauthorized use of the device such as portable terminal.

As described above, according to the seventh embodiment of the present invention, the spot registration system is designed in such manner that the system detects the change of the normally stationed spot, to issue alarm by giving alarm sound or by turning on the signal lamp, to notify the change of the normally stationed spot, and to stop the function of the spot registration system. As a result, it is possible to notify that the system has been stolen.

(8th Embodiment)

An eighth embodiment of the spot registration system of the present invention is a system to monitor number or cycle of visits to the normally stationed spot and detest abnormal condition by detecting that it is deviated from the allowable operation range around the normally stationed spot.

Basic arrangement of the eighth embodiment is the same as the seventh embodiment except that the normally stationed spot recognizing means comprises abnormality sensing means for monitoring number and cycle of visits to the normally stationed spot and means for finding abnormality when it is deviated from the allowable operation range around the normally stationed spot.

Figure 8:
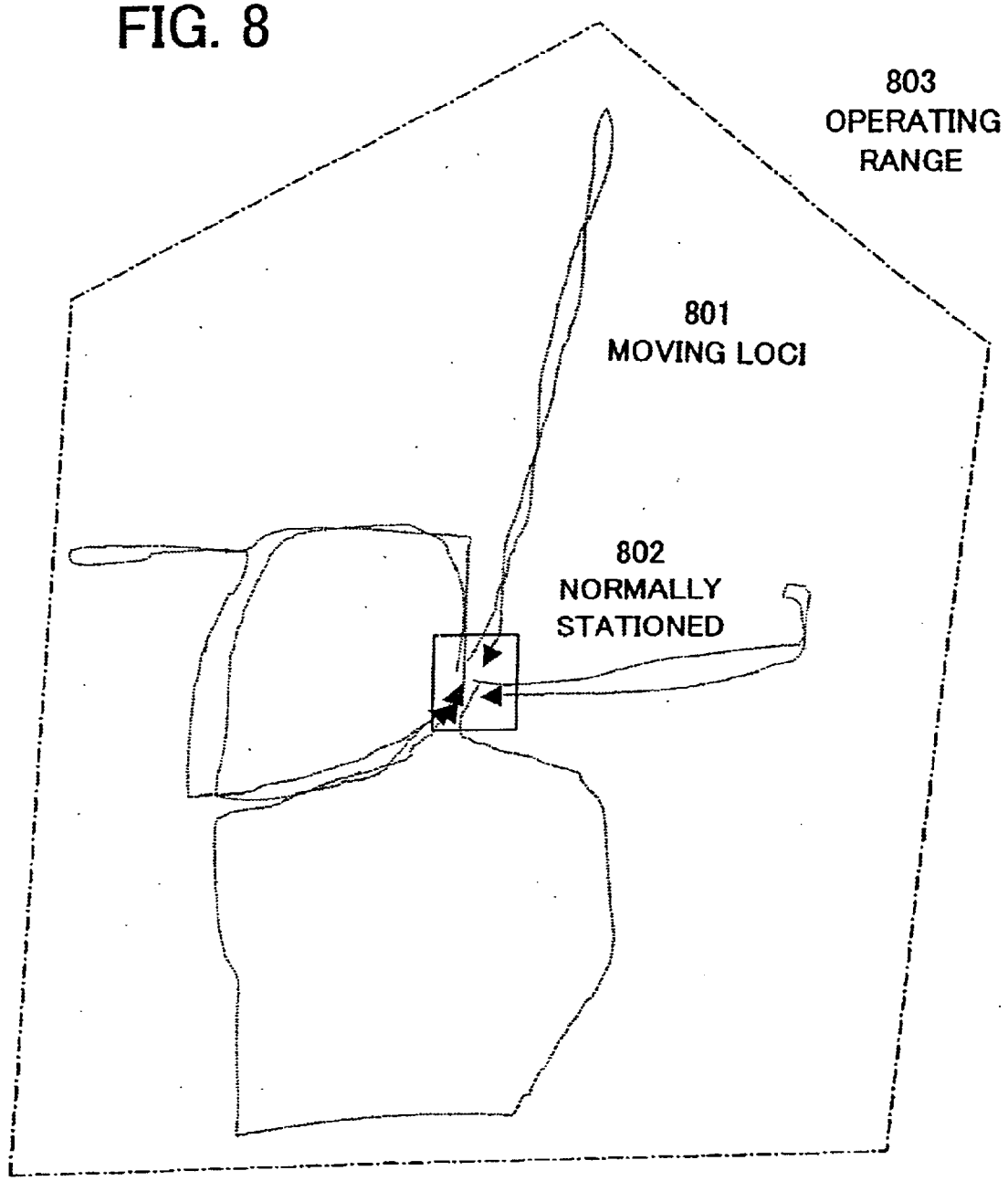
FIG. 8 is a drawing to show a moving locus for explaining operation of an eighth embodiment of the spot registration system according to the present invention.
Figures 9, 10:
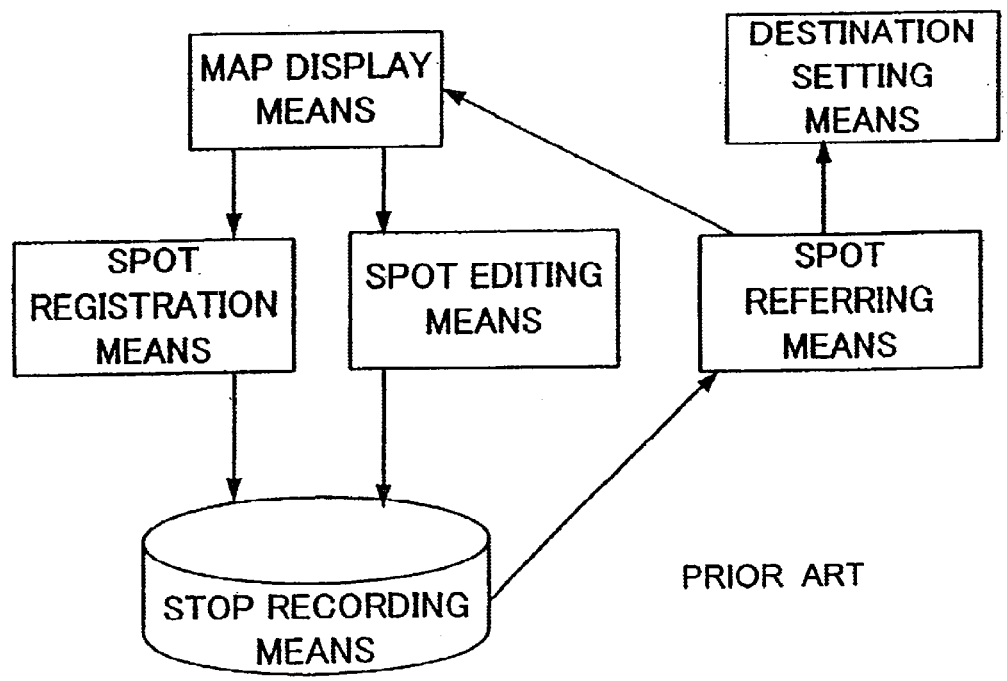
FIG. 9 is a drawing to show departure and arrival records for explaining operation of an eighth embodiment of the spot registration system according to the present invention.
FIG. 10 is a functional block diagram of a conventional type spot registration system.

FIG. 8 is a drawing to show moving locus when the eighth embodiment of the spot registration system of the present invention is used by moving it in the application of a car navigation system. A place where moving loci 801 are concentrated at the center is a normally stationed spot 802, and it is expressed as a range from a certain central point or as a regional information. FIG. 9 is a table showing a departure and arrival record 901, describing record of departure time and arrival time of the spot registration system of the eighth embodiment when the vehicle is departing from or arriving at the normally stationed spot.

Now, description will be given on operation of the eighth embodiment of the present invention with the above arrangement. In FIG. 8, a range sufficiently including moving loci 801 in the past is defined as an operation range 803. This operation range 803 may be automatically obtained from the moving loci 801 in the past or may be defined by manual operation.

When the position recognizing means 103 recognizes the deviation of the system position from the operation range 803, it is judged that abnormal condition has occurred, and alarm or notification is issued or system function is stopped. As a result, it is possible to prevent the use of the system beyond the operation range defined in advance.

The position recognizing means 113 obtains statistical data such as number of visits to the normally stationed spot within a certain period or repeating cycle of departure and arrival. If it is supposed now that the longest period from the departure to the arrival is 4 days, the system can detect the abnormality on 5th day and to notify the abnormal condition.

Such behavior pattern may occur as a result of the intention of the user, and it is confirmed by a certified confirmation message such as a code number. If there is no confirmation in response to the correct code number, it is regarded as a theft or an accident, and alarm and notification are issued.

As described above, the eighth embodiment of the present invention is designed in such manner that the spot registration system monitors number and cycle of the visits to the normally stationed spot and senses the abnormality by detecting deviation from the allowable operation range around the normally stationed spot. Thus, theft or accident can be detected and notified.

INDUSTRIAL APPLICABILITY

As it is evident from the above description, according to the present invention, the detected position is stored in memory, and it is possible to estimate a normally stationed spot of the system or a place frequently visited, to automatically register the normally stationed spot or position of visiting place, and further, to take adequate action against theft.

What is claimed is:

1. A spot registration system for registering position of a mobile device, characterized by position detecting means for detecting position of the system, position storage means for storing the detected position, position recognizing means for recognizing a spot to be registered according to position storage information obtained from the position storage means, means for registering the recognized spot, and clock means, whereby said position recognizing means recognizes said position as a spot to be registered when said clock means determines that the system is remaining at a certain position for longer than a predetermined time period which is more than several hours, thereby making it possible to determine said position as a normally stationed spot.

2. The spot registration system according to claim 1, characterized by mobile communication means, and in that said position detecting means comprises means for detecting position of the system based on information from a base station of said mobile communication means.

3. The spot registration system according to claim 1, characterized by GPS receiving means, and in that said position detecting means comprises means for detecting position based on GPS information obtained from said GPS receiving means.

4. The spot registration system according to claim 1, characterized by a heading sensor and a mobile sensor, and in that said position detection means comprises means for detecting position using said heading sensor and said mobile sensor.

5. The spot registration system according to claim 1, characterized by traffic information receiving means, and in that said position detecting means comprises means for detecting position based on a present position information obtained from said traffic information receiving means.

6. The spot registration system according to claim 1, characterized by normally stationed spot recognizing means for recognizing a normally stationed spot of the system based on said position storage information.

7. The spot registration system according to claim 6, characterized in that said normally stationed spot recognizing means comprises means for recognizing change of the normally stationed spot.

8. The spot registration system according to claim 7, characterized by alarm means for issuing alarm to notify that the normally stationed spot has been changed in response to the recognition of the change of the normally stationed spot.

9. The spot registration system according to claim 8, characterized in that said alarm means comprises means for issuing alarm sound or turning on a signal lamp of a specific aspect.

10. The spot registration system according to claim 7, characterized by notification means for notifying the change of the normally stationed spot to a predetermined destination in response to the recognition of the change of the normally stationed spot.

11. The spot registration system according to claim 7, characterized by function stopping means for stopping function of the system in response to the recognition of the change of the normally stationed spot.

12. The spot registration system according to claim 7, characterized in that said normally stationed spot recognizing means comprises means for monitoring number and cycle of visits to the normally stationed spot and means for detecting abnormality based on number and cycle of the visits.

13. The spot registration system according to claim 7, characterized in that said normally stationed spot recognizing means comprises means for setting an allowable operation range around the normally stationed spot and means for generating an abnormality sensing signal by detecting deviation from said allowable operation range.

\* \* \* \* \*